March 11, 1947.   H. D. WARSHAW   2,417,097
VARIABLE INDUCTANCE FOR TELEMETERING SYSTEMS
Filed April 10, 1945
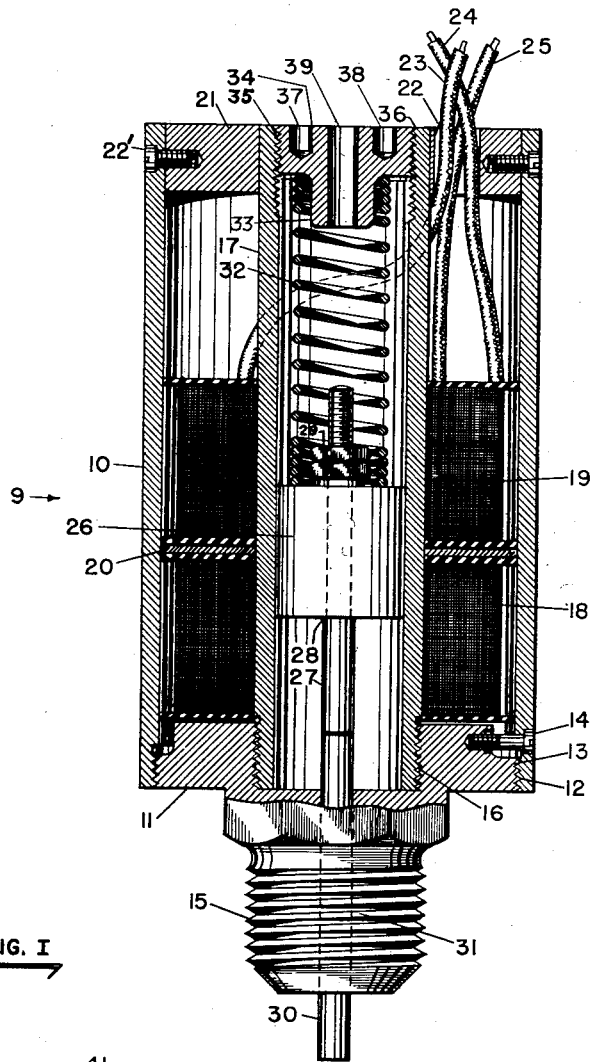
FIG. I
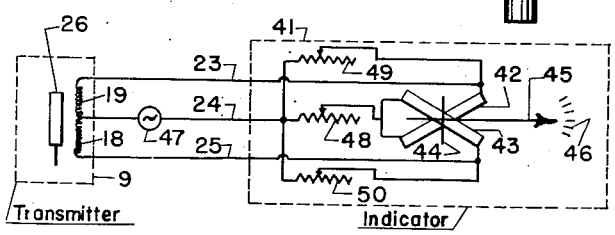
FIG. II
Inventor
HOWARD D. WARSHAW
By Ralph Chappell
Attorney Patented Mar. 11, 1947

2,417,097

UNITED STATES PATENT OFFICE 2,417,097

VARIABLE INDUCTANCE FOR TELEMETERING SYSTEMS

Howard D. Warshaw, Drexel Hill, Pa.

Application April 10, 1945, Serial No. 587,600

7 Claims. (Cl. 171—242)

(Granted under the act of March 3, 1883, as amended April 30, 1928; 370 O. G. 757)

This invention relates to a remote indicating or telemetering system comprising a transmitter unit and indicator unit remote from each other but electrically interconnected to form an impedance bridge and wherein any change in a condition such as pressure, temperature, liquid level, and the like when applied to the transmitter unit will result in a like change in the indicating element of the indicator unit.

The general object of this invention is to provide a novel and improved construction for the transmitter unit of telemetering systems of the type described.

A specific object is to provide a transmitter unit including a pair of coils connected in series, a core movable relative to the coils to increase the inductive reactance of one and to simultaneously decrease the reactance of the other, and an adjustable resilient means which biases the core to its "zero" position and also determines the extent of core travel for a given change in the condition.

Still another object is to provide a transmitter unit of the class described having an improved flux path for the coils of the transmitter.

These and other objects will become apparent from the detailed description to follow when considered with the accompanying drawings, in which Fig. 1 is a vertical section through the transmitter unit, and Fig. 2 is a schematic diagram of one type of telemetering circuit to which the transmitter unit shown in Fig. 1 may be connected.

Referring now to Fig. 1, the transmitter 9 is there shown in a form which makes it particularly adaptable for mounting directly in an engine block in order to measure oil pressure. However, it is to be understood that the invention is not to be so limited since it will be evident that the novel principles of construction which are to be described may be applied equally as well for transmitting conditions other than pressure.

The transmitter unit 9 comprises a cylindrical tubular housing 10 which is made of magnetic material such as steel. The bottom end of housing 10 is closed by an end plate 11 also of magnetic material and it will be seen that this plate has an external threaded portion 12 which engages an internal threaded portion 13 at the lower end of the housing 10. When plate 11 has been screwed into housing 10 so that its bottom face is flush with the bottom face of housing 10 it may be secured in such position by one or more set screws 14.

Integral with the end plate 11 is a threaded mounting portion 15 which is adapted to be screwed into an engine block (not shown). The central portion of plate member 11 is provided with a threaded recess portion 16 for receiving a cylindrical tube 17 which is made from a non-magnetic material. Surrounding tube 17 and supported thereon are a pair of preformed transmitter coils 18, 19 which are separated by an annular washer 20 that is made from a magnetic material having a high permeability.

The top of casing 10 is closed by an annular plate 21 also of magnetic material which is fastened into position by set screws 22'. It will be seen that plate member 21 has an opening 22 for bringing out the three leads 23, 24 and 25 from the coils 18 and 19 which are connected in series and mid-tapped.

Movable reciprocally within the tube 17 is a core 26 that is made from material having a high magnetic permeability. Core 26 is mounted on a shaft section 27 which is made of non-magnetic material and which extends through the core 26. The core 26 rests upon an external shouldered portion 28 of the shaft section 27 and is fastened securely thereon by means of the nuts 29 which are screwed down upon a threaded portion at the top of this shaft section.

Secured to the bottom of the shaft section 27 of non-magnetic material is another shaft section 30 or piston which is preferably made from the same material as the mounting portion 15 in order to eliminate the temperature effect on the clearance between piston 30 and the central opening 31 provided in the mounting portion 15 through which the piston 30 passes.

The bottom end of a coil spring 32 which is made from non-magnetic material rests upon the top of the core 26. The top of spring 32 is received by a neck portion 33 of a plug 34. This plug has an external threaded portion 35 which engages internal threads 36 on the tube 17. Recesses 37, 38 may be provided in the top wall of the plug 34 for the insertion of a tool by which plug 34 is made adjustable axially of tube 17.

In this particular embodiment, the zero setting of the transmitter unit 9 is made by adjusting plug 34 axially for zero loading on spring 32 at zero applied pressure. However, for some applications, the initial adjustment of spring 32 may be a loaded one. In any event, it will be evident that spring 32 may be adjusted to obtain any desired ratio between travel of core 26 in the tube 17 and a given change in a condition. Plug 34 also serves as an end stop for upward travel of the core 26 and is further provided with a central opening 39 which serves to vent tube 17 to the atmosphere.

Fig. 2 shows how the coils 18, 19 of the transmitter unit are connected with each other and into the complete telemetering system. Referring now to Fig. 2, it is seen that coils 18, 19 are connected together, the arrangement being such that when energized, the magnetic fluxes produced by the coils are opposed. By connecting the coils in flux opposition, voltage variation in the coils for a given change in position of core 26 is quite pronounced and hence reduces the sensitivity requirements of any indicator that may be used with the transmitter. Three leads 23, 24 and 25 extend from the transmitter unit to a remote position where the indicator unit 41 is located. This unit, shown only diagrammatically, comprises coils 42, 43 that are fixed in position at an angle to each other, and a vane 44 which is positioned by the resultant magnetic field set up by coils 42, 43. Vane 44, made of highly permeable magnetic material is mounted on a rotatable shaft (not shown). This shaft carries a pointer 45 which sweeps over scale 46.

Lead 23 is connected to one end of coil 42; lead 25 is connected to one end of coil 43; and lead 24 is connected through a source 47 of alternating current and an adjustable resistor 48 to the opposite ends of coils 42, 43. Adjustable resistors 49 and 50 are connected in parallel with coils 42 and 43 respectively.

For a detailed construction of the indicator unit 41, reference is made to my copending application, Serial No. 594,130 filed May 16, 1945. For purposes of this application, it is suffice to say that since coils 42 and 43 are fixed in position, each will produce a magnetic field fixed in direction. The resultant magnetic field of the two fixed fields however, will have a direction that is a function of the ratio of the magnitude of the alternating currents passing through these coils. The vane 44 being of magnetic material and being free to rotate in the resultant field will align itself and hence pointer member 45 with that field. Thus by varying the ratio of the currents passing through coils 42 and 43, the pointer member 45 will move over the scale 46.

It will now be evident that the telemetering system described constitutes an impedance bridge. Transmitter coils 18, 19 make up two legs of the bridge and indicator coils 42, 43 make up the other two legs, the alternating current source 47 being connected across the diagonals of the bridge.

The dimensions of the magnetic circuits associated with coils 18 and 19 are so proportioned that when core member 26 is located midway between these two coils as shown in Fig. 1, the inductive reactance of coil 18 is equal to that of coil 19. That is to say, when core 26 is in the position shown, the magnetic circuit for coil 18 through the lower half of core 26, washer 20, the portion of the wall of the cylindrical tube 10 below this washer, and bottom end plate 11 has a reluctance which is equal to that of the magnetic circuit for coil 19 which extends through the upper half of core 26, washer 20, the portion of the wall of tube 10 above this washer and the top end plate 21.

Thus with the core 26 in the mid position, the bridge circuit is balanced which means that the current through coil 42 of the indicator unit 41 is the same as that through coil 43. Pointer member 45 will accordingly take up a position as shown in Fig. 2. Now should the core 26 be moved upwardly from its mid position in response to an increase in pressure on the lower end of piston 30, or downwardly in response to a decrease in pressure, it is evident that the reluctance of the magnetic circuit associated with one of the transmitter coils will be increased while the reluctance of the magnetic circuit associated with the other transmitter coil will be simultaneously decreased. To the same extent the inductive reactance of these transmitter coils will be simultaneously increased and decreased respectively thus unbalancing the bridge. Currents through the indicator coils 42 and 43 in the other half of the bridge will also be simultaneously increased and decreased respectively, with the result that the direction of the resultant magnetic field produced by these two coils will shift. Vane 44 and pointer member 45 follow the change in direction of the resultant field and hence the change in the condition, i. e. pressure on piston 30 will be shown on the scale 45 of the indicator unit 41.

Resistor 48 is adjustable and controls the sensitivity of the indicator unit 41, i. e., it governs travel of the pointer 45 for a given travel of core 26 in the transmitter unit. Resistors 49 and 50, also adjustable, govern the position of the limits of travel of pointer 45 with respect to the limits of scale 46.

In conclusion, it will be understood that while the embodiment of the invention which has been described is to be preferred, minor modifications in the construction and arrangement of parts may be made by those skilled in the art without departing from the spirit and scope of the invention as defined in the appended claims.

The invention described herein may be manufactured and used by or for the Government of the United States of America for governmental purposes without the payment of any royalties thereon or therefor.

What is claimed is:

1. A transmitter for use in a system for telemetering a condition, said transmitter comprising, a pair of coils mounted in superposed relation, said coils when energized producing opposing magnetic fields, a washer of magnetic material separating said coils, a core of magnetic material movable through said coils in response to a change in said condition to increase the reluctance of the magnetic circuit of one of said coils and to simultaneously decrease the reluctance of the magnetic circuit of the other coil, and adjustable non-magnetic resilient means engaging one end of said core for regulating movement thereof.

2. A transmitter for use in a system for telemetering a condition, said transmitter comprising, a pair of coils mounted in superposed relation, said coils when energized producing opposing magnetic fields, a washer of magnetic material between said coils, a casing of magnetic material enclosing said coils, a core of magnetic material movable through said coils in response to a change in said condition to increase the reluctance of the magnetic circuit of one of said coils and to simultaneously decrease the reluctance of the magnetic circuit of the other coil, and adjustable non-magnetic resilient means engaging one end of said core for regulating movement thereof.

3. A transmitter for use in a system for telemetering a condition, said transmitter comprising, a tubular member of non-magnetic material, a pair of coils mounted in superposed relation upon said member, a core of magnetic material disposed within said tubular member, said core being movable through said coils in response to a change in said condition to increase the reluctance of the magnetic circuit of one of said coils and to simultaneously decrease the reluctance of the magnetic circuit of the other coil, and adjustable non-magnetic resilient means disposed within said tubular member and engaging one end of said core for regulating movement thereof.

4. A transmitter for use in a system for telemetering a condition, said transmitter comprising, a tubular member of non-magnetic material, a pair of coils mounted in superposed relation upon said member, a core of magnetic material disposed within said tubular member, said core being movable through said coils in response to a change in said condition to increase the reluctance of the magnetic circuit of one of said coils and to simultaneously decrease the reluctance of the magnetic circuit of the other coil, a plug disposed in one end of said tubular member, a non-magnetic spring carried within said tubular member between said plug and the core end opposite the end to which a force is adapted to be applied in accordance with the magnitude of said condition, and means for adjusting said plug axially in said tubular member to thereby vary the loading on said spring.

5. A transmitter for use in a system for telemetering a condition, said transmitter comprising, a tubular member of non-magnetic material, a pair of coils mounted in superposed relation upon said member, a core of magnetic material disposed within said tubular member, said core being movable through said coils to increase the reluctance of the magnetic circuit of one of said coils and to simultaneously decrease the reluctance of the magnetic circuit of the other of said coils, a rod member connected to one end of said core, said rod member being adapted to be actuated in accordance with changes in the condition to be telemetered to thereby effect a corresponding change in the position of said core relative to said coils, and adjustable non-magnetic resilient means engaging the other end of said core.

6. A transmitter for use in a system for telemetering a condition, said transmitter comprising, a tubular member of non-magnetic material, a pair of coils mounted in superposed relation upon said member, a washer of magnetic material separating said coils, a core of magnetic material disposed within said tubular member and movable through said coils so as to increase the reluctance of the magnetic circuit of one coil and to simultaneously decrease the reluctance of the magnetic circuit of the other coil, a non-magnetic rod member connected to one end of said core, said rod member being adapted to be actuated in accordance with changes in the condition to be telemetered to thereby effect a corresponding change in the position of said core relative to said coils, a plug disposed within the other end of said tubular member, a non-magnetic spring carried within said tubular member between said plug and the other end of said core, and means for axially adjusting said plug in said tubular member to thereby vary the loading on said spring.

7. A transmitter for use in a system for telemetering a condition, said transmitter comprising, a tubular member of non-magnetic material, a pair of coils mounted in superposed relation upon said member, an annular washer of magnetic material separating said coils, a core of magnetic material disposed within said tubular member, said core being movable through said coils in response to a change in said condition to increase the reluctance of the magnetic circuit of one of said coils and to simultaneously decrease the reluctance of the magnetic circuit of the other of said coils, a casing of magnetic material enclosing said coils, a non-magnetic rod member connected to one end of said core, said rod member being adapted to be actuated in accordance with changes in the condition to be telemetered, a plug member disposed in one end of said tubular member, a non-magnetic spring carried within said tubular member between said plug and the core end opposite the end to which a force is adapted to be applied in accordance with the magnitude of said condition, and means for adjusting said plug axially in said tubular member to thereby vary the loading on said spring.

HOWARD D. WARSHAW.

REFERENCES CITED

The following references are of record in the file of this patent:

UNITED STATES PATENTS

| Number | Name | Date |
| --- | --- | --- |
| 2,050,629 | Quereau et al. | Aug. 11, 1936 |
| 2,134,104 | Cressy | Oct. 25, 1938 |
| 1,891,156 | Harrison | Dec. 13, 1932 |
| 2,027,140 | Alexanderson | Jan. 7, 1936 |
| 2,069,959 | Kuljian | Feb. 9, 1937 |
| 2,096,867 | Thompson | Oct. 26, 1937 |